March 28, 1967
L. H. DOWDELL
3,310,872
END CUTTER
Filed July 23, 1965
2 Sheets-Sheet 1
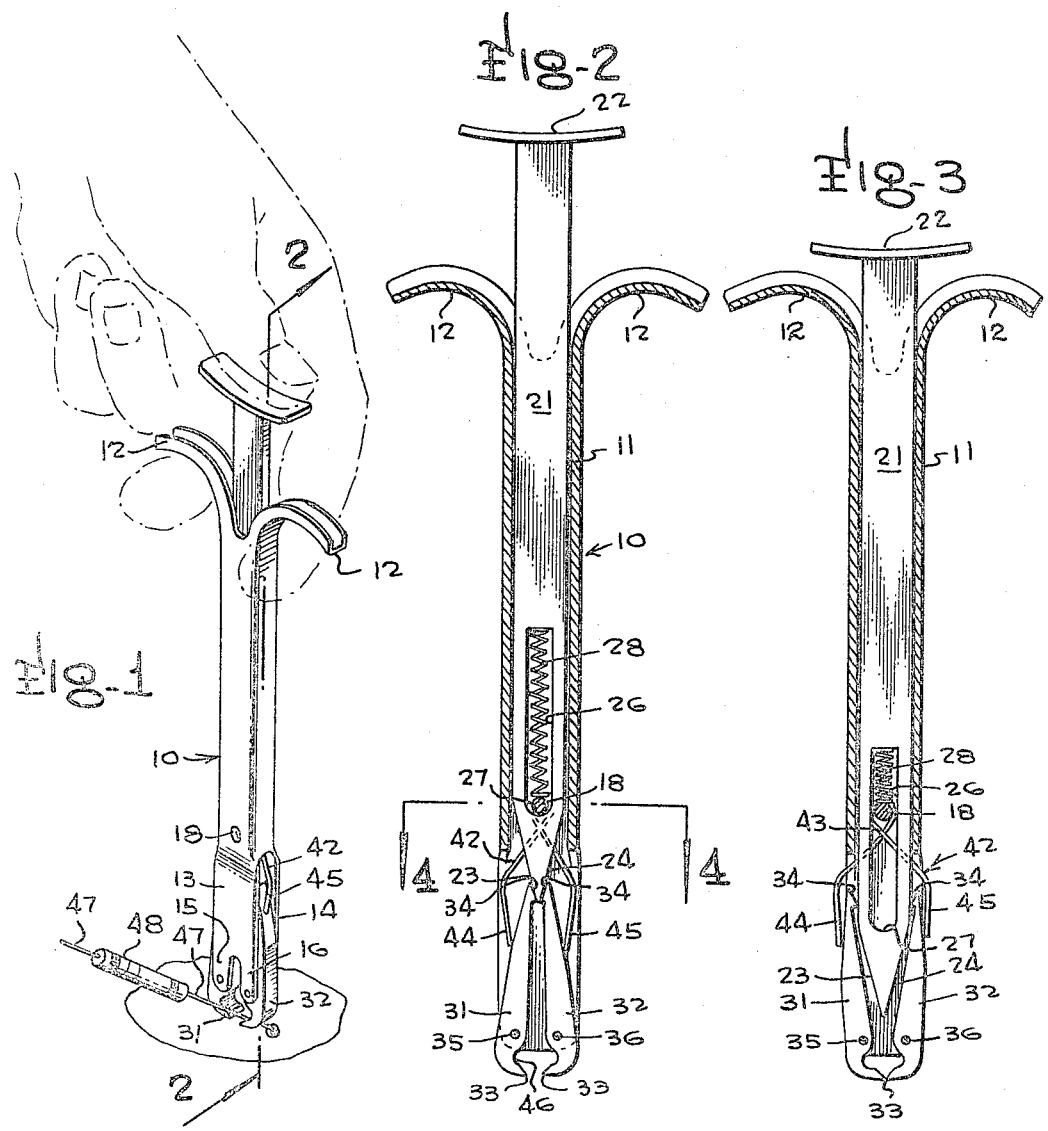
INVENTOR
LANSING H. DOWDELL
BY Mason, Fenwick & Lawrence
ATTORNEYS

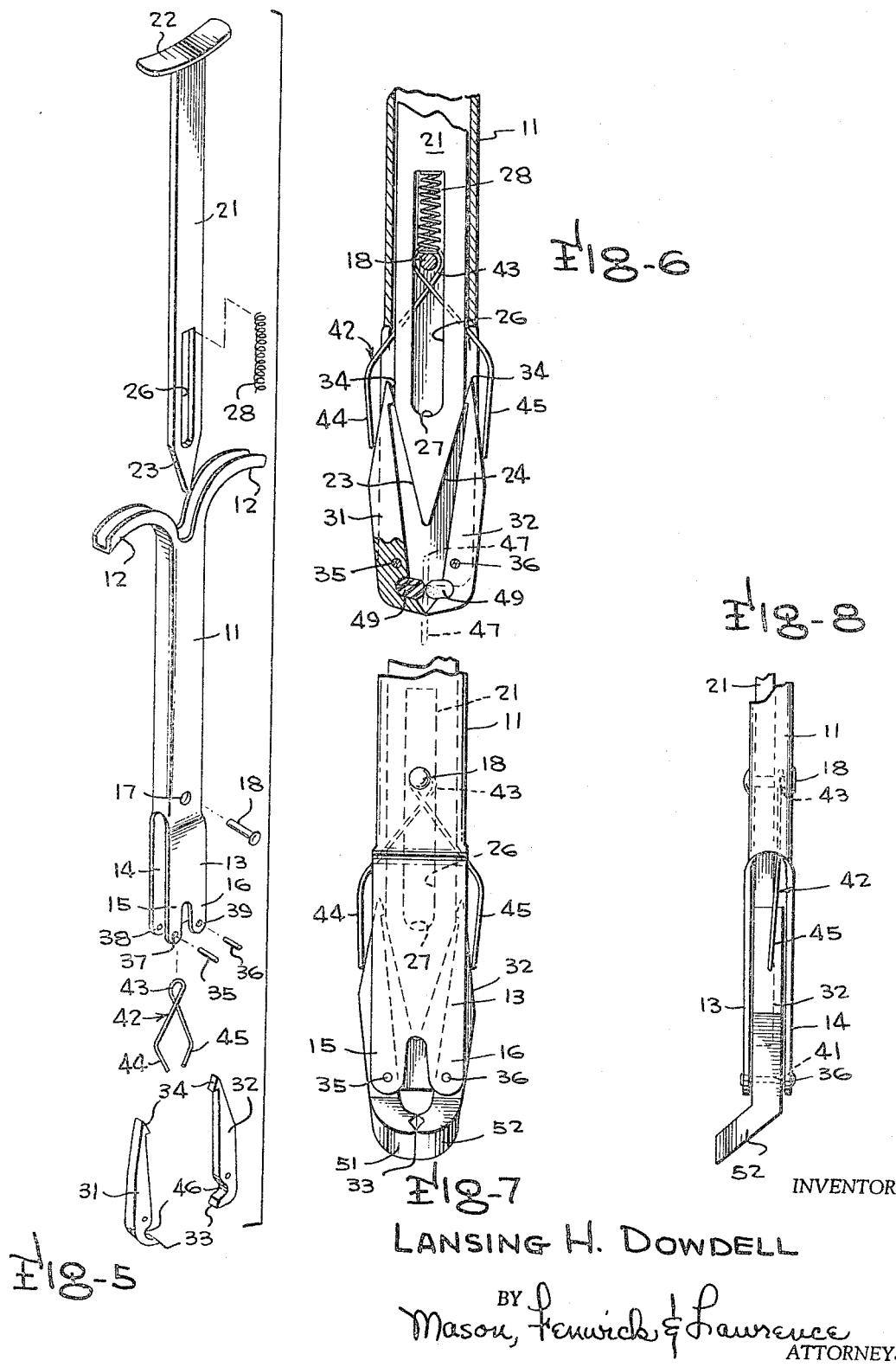

United States Patent Office 3,310,872
Patented Mar. 28, 1967

3,310,872
END CUTTER
Lansing H. Dowdell, Saugerties, N.Y., assignor to Dell
Industries, Saugerties, N.Y., a company of New York
Filed July 23, 1965, Ser. No. 474,222
11 Claims. (Cl. 30—187)

This invention relates generally to cutting tools and more particularly to a forceps type cutting tool for the cuting, during assembly and disassembly, of small electrical wires and other equally delicate materials in remote and inaccessible places where the fingers cannot be conveniently used.

There has long been a need in the electronics industry for a cutter of the type herein described to effect repairs in areas of electronic devices where the number of wires is extremely dense. Currently it is very time consuming to effect repairs in such places due to the problem of depth in the electronic device and the problem of cutting and holding the wires when operating upon them in the deep recesses of the device. The tool of the present invention is designed to overcome these problems because the tool has a long reach to penetrate to relatively remote recesses and cut or otherwise operate upon a desired electronic component. The particular design of the tool of this invention results in a great mechanical advantage which permits cutting in areas which allow limited mobility to the cutting tool. Further, this particular tool is designed to give a flush cut at the most forward portion of the cutting jaws. This is highly important when cutting excess lead lengths in electronic components so as not to leave an upstanding portion of the lead to serve as an antenna within its particular portion of the electronic circuitry. Such an upstanding lead in is highly detrimental to circuits operating in a microwave frequency. It should be further noted that the application has considerable application to other fields such as in dentistry. The tool would allow the dentist to operate upon the tissues of the mouth in the farthest recesses.

Therefore, an object of this invention is the provision of a forceps type cutting tool which enables the operation of the cutting jaws at the extreme end of an elongated body member from a remote control location.

Another object of this invention is the provision of a cutting tool in which the elongated body and cutting jaw support mechanism is extremely compact and slim to enable positioning of cutting jaws in remote locations of restricted accessibility.

A still further object of this invention is the provision of a cutting tool particularly adapted to be used with electronic circuitry having cutting jaws so constructed that they form flush cuts at a desired cutting point.

Another object of this invention is the provision of a cutting tool having means associated with the cutting jaws to retain the cut portion of the material operated on so that it may be withdrawn with the cutting tool.

Still another object of this invention is the provision of a forceps type cutting tool having a large factor of mechanical advantage to permit easy cutting of relatively hard materials.

Yet another object of this invention is the achievement of a cutting tool of durable and rugged construction lending itself to convenient and inexpensive construction.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

In the drawings:

FIGURE 1 is a perspective view of the cutting tool of the present invention shown being used to cut a portion of an electronic component;

FIGURE 2 is a vertical section view taken along lines 2—2 of FIGURE 1 showing the cutting tool in its normal rest position;

FIGURE 3 is a vertical section view similar to that of FIGURE 2; however, showing the cutting jaws in a closed and cutting position;

FIGURE 4 is a horizontal section view taken along lines 4—4 of FIGURE 2;

FIGURE 5 is an exploded perspective view of the tool;

FIGURE 6 is a partial vertical section view similar to that of FIGURE 3; however, showing a different embodiment of the invention;

FIGURE 7 is a partial front elevation view of the invention; however, showing a different embodiment of the cutting jaws; and FIGURE 8 is a partial side elevation view of the embodiment of the invention shown by FIGURE 7.

Referring to the drawings wherein like reference characters designate corresponding parts throughout the several figures, the cutting tool of the present invention is indicated generally by the numeral 10. Comprising the tool 10 is a cutting tool housing 11 of elongated hollow rectangular configuration terminating at one remote end thereof in a pair of divergent outwardly curved finger tabs 12. The other end of the housing 11 is so split as to form a pair of flat cutter holding extensions 13 and 14.

The front cutter holding extension 13 terminates in a pair of holding fingers 15 and 16, while the rear cutter holding extension 14 is of unitary construction throughout its length. At intermediate portions along a length of housing 11 is a rivet aperture 17 through which the holding rivet 18 is adapted to be inserted to generally maintain certain of the operative parts of the invention in their proper locations.

The housing 11 is adapted to receive within its hollow interior an elongated operating shaft 21 which generally conforms to the cross-sectional shape of the hollow material of the cutter housing. At the remote end of the operating shaft, which projects outwardly from the top of the housing 11, is a pressure application member 22 affixed to the top of the shaft 21 and having generally a concave shape which is adapted to receive the thumb of the operator. At the remote end of the shaft 21 which lines within the cutting tool housing is a pair of converging inclined shaft surfaces 23, 24 which terminate at a relatively sharp point 25. Beginning near the start of the converging inclined surfaces 23, 24 and located generally centered in the shaft 21 is a rectangular elongated aperture 26. At the lower most end of the aperture 26 is a rivet stop 27 against which the holding rivet 18 is positioned when the tool is in a rest position. A shaft retracting spring 28 is so positioned as one end rests against the holding rivet 18 and the other end is positioned against the spring stop 29. Therefore, it can be seen that when the operating shaft plunger 21 is reciprocated downwardly into the cutting tool housing, the shaft retracting spring 28 will be compressed between the spring stop 29 and the holding rivet 18 thereby exerting a compressive force against the plunger shaft 21 and returning it to its normal rest position when the operator releases pressure upon the member 22. To effect the cutting for which the present invention is designed, there is provided between the cutter holding extensions 13 and 14, a pair of cutters 31, 32. The cutters 31, 32 are of similar shapes; however, they are constructed to be positioned in opposed relation to effect concurrent cutting when the operating plunger shaft 21 is reciprocated downwardly. At the cutting end, each cutter terminates in a hook shaped portion which is designed to effect the cutting operation at the cutting edge 33 wherein the cutting edges of each cutter lie opposed to one another. The cutters generally have an elongated tapered shape which terminates at the end remote from the cutting edges 33 in an inclined cutter opening surface 34 which is adapted to mate with the converging inclined shaft surfaces 23, 24. Therefore, it can be seen that the inclined opening cutter surface 34 diverges outwardly from each of the cutters to cooperate with the converging inclined shaft surfaces.

Maintaining the cutters 31, 32 in operative relation with the housing 11 and pivotally affixed between the cutter holding extensions 13, 14 are cutter retaining pins 35, 36. Retaining pin 35 is received within the aperture 37 of holding finger 15 and thence through cutter 31 after which it terminates within the aperture 38 of the rear holding extension 14. In a like manner cutter 32 is held in operative position by retaining pin 36 being received within the aperture 39 of holding finger 16 from which the pin then passes through the cutter to terminate within aperture 41 in the rear cutter holding extension 14. In order that the cutters may be kept in an open position ready to engage the material to be cut, there is provided a cutter jaw opening spring 42 which is of generally unitary construction having a loop 43 at its intermediate portion and thence extending downwardly in a pair of downwardly curved arms 44, 45 which rest against the cutters 31, 32 respectively. The arms 44, 45 of the spring 42 are inwardly curved to a sufficient amount so as to always bias inwardly the inclined cutter opening surface 34 of the cutters. This always maintains the surface 34 against the inclined surfaces 23, 24 of the operating plunger shaft and obviously, when the shaft is in its upwardly rest position, the spring 42 will bias the cutters so that the cutting edges 33 will be in an open position. Just inwardly of the cutting edges 33 each cutter has a jaw recess 46 of concave configuration to help form the cutting edges 33.

In operation of the embodiment of the invention shown by FIGURES 1 through 5 the operator would normally grasp the tool by placing a finger upon the outwardly curved finger tabs 12 and the index finger upon the shaft 21. The cutting tool would then be inserted to the desired location where the cut is to be made and, as shown by FIGURE 1, the wire lead 47 of an electronic component 48 is positioned between the cutting edges 33 at which time the operator would then depress the operating plunger shaft 21 thereby forcing the converging inclined surfaces 23, 24 against inclined surfaces 34 of each of the cutters. As the shaft 21 is moved downwardly, the inclined surfaces 34 of the cutters will slide along the inclined surfaces of the shaft which spreads apart the cutters in their rearward portion. This motion causes the cutters to pivot about the pins 35 and 36 thereby closing the cutting edges 33 upon one another. As the operating plunger shaft 21 is being depressed, the shaft retracting spring 28 is compressed between the holding rivet 18 and the spring stop 29 thereby storing energy. In addition, the inwardly curved arms 44 and 45 of the cutter jaw opening spring 42 have been moved outwardly by the action associated with the opening of the rearward most portions of the cutters. Therefore, as the operator releases pressure upon the shaft 21 the retracting spring 28 will restore the shaft to its upwardly rest position and will cause the holding rivet 18 to be received at the shaft stop 27. Concurrently as the shaft is moving upwardly due to the retracting spring 28, the inwardly curved spring arms 44 and 45 are pressing inwardly on the rearmost portion of the cutters thereby opening the cutting edges 33 and maintaining inclined surfaces 34 in operative engagement with the inclined shaft surfaces 23 and 24.

In a second embodiment of the invention shown by FIGURE 6 the jaw recess 46 of each cutter is provided with a suitably shaped piece of resilient material 49 integrally held in position by a suitable adhesive or other means. In certain applications such as electronic work, it is desired to retract the cut portions of components lead wires so as to prevent the possibility of short circuits occurring. Such a mode of operation is accomplished by this particular embodiment because when the cutting edges 33 come into contact with the material to be cut, the resilient material 49 will also be brought adjacent the material to be cut. As the cutting takes place, the resilient material 49 will frictionally engage the severed material so that the loose severed end is then maintained within the jaws of the cutters and can be retracted by the operator before the operating plunger shaft 21 is released.

In a third embodiment of the present invention shown by FIGURES 7 and 8, the cutting tool is supplied with cutters 51, 52 which differ from those described above in that the cutting edges 33 are at the ends of the cutters which have been angled sidewardly of the longitudinal centerline of operating shaft 21. Therefore, as the tool is operated, the angularly outwardly inclined cutters may effect cutting to one side or the other of the tool while the tool is maintained in what might be a very restricted opening. Such a tool might be useful by dentists for cutting tissues or other materials in the deep, far recesses of the patient's mouth. It should be noted that the angle of inclination to the longitudinal centerline of the shaft is relatively unimportant and could be of any desired angularity.

Various modifications may be made in the invention without departing from the spirit and scope thereof; and it is desired, therefore, that only such limitations shall be placed thereon as are imposed by the prior art and are set forth in the appended claims.

What is claimed is:

1. A cutting tool comprising an elongated hollow housing of rectangular configuration, cooperating cutters pivotally mounted in opposing relation at one end of the housing, a reciprocable rectangular plunger shaft extending through the housing having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface, with respect to the opposing cutter, the diverging inclined planar surfaces adapted to operatively mate with respective inclined surfaces of the plunger shaft to effect closing of the cutting jaws when the plunger shaft is reciprocated, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position.

2. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, the plunger shaft having an elongated aperture located along the longitudinal centerline axis of the shaft and having a spring stop end and a guiding member stop end, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position.

3. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, the plunger shaft having an elonagted aperture located along the longitudinal centerline axis of the shaft and having a spring stop end and a guiding member stop end, means for biasing the plunger shaft in a non-operative rest position including a resilient shaft retracting spring positioned within the elongated aperture of the plunger shaft, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position.

4. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, the plunger shaft having an elongated aperture located along the longitudinal centerline axis of the shaft and having a spring stop end and a guiding member stop end, means for biasing the plunger shaft in a non-operative rest position including a resilient shaft retracting spring positioned within the elongated aperture of the plunger shaft, means for guiding the plunger shaft between the rest position and the operative cutting position when the plunger shaft is reciprocated and to effect cessation of movement of the plunger shaft at the rest position, the plunger guiding means comprising a fixed member bridging the hollow housing, the affixed member lying within the elongated aperture of the shaft and operatively positioned between the shaft retracting spring and the guiding stop end, means causing the cutting jaws to open as the plunger shaft is returned to the rest position.

5. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position including a resilient cutter opening spring having a pair of free ends and a fixedly mounted looped midportion, each end of the cutter opening spring lying adjacent the rearward end of a respective cutter in compressive relation to maintain a bias upon the cutters tending to open the cutting jaws at such times as the plunger shaft is being moved to the rest position.

6. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position including a resilient cutter opening spring having a pair of free ends and a fixedly mounted looped midportion, each end of the cutter opening spring lying adjacent the rearward end of a respective cutters in compressive relation to maintain a bias upon the cutters tending to open the cutting jaws at such times as the plunger shaft is being moved to the rest position, the looped midportion of the cutter opening spring being mounted about the fixed member guiding means.

7. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, the plunger shaft having an elongated aperture located along the longitudinal centerline axis of the shaft and having a spring stop end and a guiding member stop end, means for biasing the plunger shaft in a non-operative rest position including a resilient shaft retracting spring positioned within the elongated aperture of the plunger shaft, means for guiding the plunger shaft between the rest position and the operative cutting position when the plunger shaft is reciprocated and to effect cessation of movement of the plunger shaft at the rest position, the plunger guiding means comprising a fixed member bridging the hollow housing, the fixed member lying within the elongated aperture of the shaft and operatively positioned between the shaft retracting spring and the guiding stop end, means causing the cutting jaws to open as the plunger shaft is returned to the rest position including a resilient cutter opening spring having a pair of free ends and a fixedly mounted looped midportion, each end of the cutter opening spring lying adjacent the rearward end of a respective cutter in compressive relation to maintain a bias upon the cutters tending to open the cutting jaws at such times as the plunger shaft is being moved to the rest position, the looped midportion of the cutter opening spring being mounted about the fixed member guiding means.

8. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position, and resilient means lying wholly within the cutting jaw of each cutter to effect holding of a severed member once the cutting operation is completed.

9. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, the plunger shaft having an elongated aperture located along the longitudinal centerline axis of the shaft and having a spring stop end and a guiding member stop end, means for biasing the plunger shaft in a non-operative rest position including a resilient shaft retracting spring positioned within the elongated aperture of the plunger shaft, means for guiding the plunger shaft between the rest position and the operative cutting position when the plunger shaft is reciporcated and to effect cessation of movement of the plunger shaft at the rest position, the plunger guiding means comprising a fixed member bridging the hollow housing, the fixed member lying within the elongated aperture of the shaft and operatively positioned between the shaft retracting spring and the guiding stop end, means causing the cutting jaws to open as the plunger shaft is returned to the rest position including a resilient cutter opening spring having a pair of free ends and a fixedly mounted looped midportion, each end of the cutter opening spring lying adjacent the rearward end of a respective cutter in compressive relation to maintain a bias upon the cutters tending to open the cutting jaws at such times as the plunger shaft is being moved to the rest position, the looped midportion of the cutter opening spring being mounted about the fixed member guiding means, and resilient means lying wholly within the cutting jaw of each cutter to effect holding of a severed member once the cutting operation is completed.

10. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure application member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respective inclined surfaces of the plunger shaft to effect closing of the cutting jaws when the plunger shaft is reciprocated, means for biasing the plunger shaft in a non-operative rest position, means for guiding the plunger shaft between the rest position and the operative cutting position when the plunger shaft is reciprocated and to effect cessation of movement of the plunger shaft at the rest position, means causing the cutting jaws to open as the plunger shaft is returned to the rest position, the cutting jaws of the cutters extending outwardly from the longitudinal centerline of the plunger shaft and being angularly inclined thereto.

11. A cutting tool comprising an elongated hollow housing of rectangular configuration, cooperating cutters pivotally mounted in opposing relation at one end of the housing, a reciprocable plunger shaft extending through the housing and having one end terminating exteriorly thereof in a concave shaped pressure applicatiton member, the other end of the plunger shaft terminating in a pair of converging inclined surfaces, each of the cutters having a forward cutting jaw end and a rearward end, the rearward end having a diverging inclined planar surface with respect to the opposing cutter, the diverging inclined planar surfaces being adapted to operatively mate with respect inclined surfaces of the plunger shaft to effect closing of the cutting jaws when the plunger shaft is reciprocated, the plunger shaft having an elongated aperture located along the longitudinal centerline axis of the shaft and having a spring stop end and a guiding member stop end, means for biasing the plunger shaft in a nonoperative rest position including a resilient shaft retracting spring positioned within the elongated aperture of the plunger shaft, means for guiding the plunger shaft between the rest position and the operative cutting position when the plunger shaft is reciprocated and to effect cessation of movement of the plunger shaft at the rest position, the plunger guiding means comprising a fixed member bridging the hollow housing, the fixed member lying within the elongated aperture of the shaft and operatively positioned between the shaft retracting spring and the guiding stop end, means causing the cutting jaws to open as the plunger shaft is returned to the rest position including a resilient cutter opening spring having a pair of free ends and a fixedly mounted looped midportion, each end of the cutter opening spring lying adjacent the rearward end of a respective cutter in compressive relation to maintain a bias upon the cutters tending to open the cutting jaws at such times as the plunger shaft is being moved to the rest position, the looped midportion of the cutter opening spring being mounted about the fixed member guiding means, resilient means lying wholly within the cutting jaw of each cutter to effect holding of a severed member once the cutting operation is completed, the cutting jaws of the cutters extending outwardly from the longitudinal centerline of the plunger shaft and being angularly inclined thereto.

References Cited by the Examiner
UNITED STATES PATENTS

| | | | |
|---|---|---|---|
| 492,931 | 3/1893 | Baird | 30—187 X |
| 2,654,632 | 10/1953 | Herbert | 81—345 X |
| 2,985,957 | 5/1961 | Freedman | 30—124 |

WILLIAM FELDMAN, *Primary Examiner.*

J. C. PETERS, *Assistant Examiner.*